United States Patent [19]

Pergerson

[11] Patent Number: 4,930,033
[45] Date of Patent: May 29, 1990

[54] TAPE CLEANER AND DEGAUSSER APPARATUS

[75] Inventor: Gregory Pergerson, Woodbridge, Va.

[73] Assignee: E-Systems, Inc., Dallas, Tex.

[21] Appl. No.: 228,686

[22] Filed: Aug. 5, 1988

[51] Int. Cl.5 .............................................. G11B 5/00
[52] U.S. Cl. .................................................... 360/137
[58] Field of Search ........................... 360/137; 134/9; 15/DIG. 13

[56] References Cited

U.S. PATENT DOCUMENTS

| | | | |
|---|---|---|---|
| 3,071,178 | 10/1972 | Kuntz | 15/308 |
| 3,266,196 | 10/1962 | Barcaro | 51/135 |
| 3,370,982 | 2/1968 | Hayunga | 134/9 |
| 3,475,782 | 11/1969 | Teuber | 15/308 |
| 3,640,293 | 2/1972 | Freedman | 134/9 |
| 3,961,375 | 6/1976 | Mika et al. | 360/137 |
| 4,004,314 | 1/1977 | Post et al. | 15/97 R |
| 4,081,878 | 4/1978 | Seidel | 15/256.5 |
| 4,185,306 | 1/1980 | Dudley | 360/71 |
| 4,211,580 | 7/1980 | Vowles | 134/9 |
| 4,257,079 | 3/1981 | Yoshizawa | 360/137 |
| 4,315,294 | 2/1982 | Wilson | 360/137 |
| 4,324,014 | 4/1982 | Stutz, Jr. et al. | 15/4 |
| 4,620,256 | 10/1986 | Rubey | 360/137 |
| 4,637,088 | 1/1987 | Badarraco et al. | 15/97 R |

Primary Examiner—Robert S. Tupper
Attorney, Agent, or Firm—Harold E. Meier

[57] ABSTRACT

Tape cleaning and degaussing apparatus for cleaning, conditioning and degaussing magnetic video tape comprising a wiper means for wiping front and back surfaces of the video tape, a scrapping means engaging the front surface of the video tape for removing debris therefrom, a degaussing means for demagnetizing the video tape and a means for moving the video tape past the wiper means, scrapping means and degaussing means.

Additionally, the tape cleaner and degausser apparatus contains a clear dust cover providing easy access for removal and replacement of the cleaning mechanisms in the interior of the apparatus, as well as a bar condition LED station which informs the user when the cleaning bar needs to be rotated or changed.

6 Claims, 2 Drawing Sheets

TAPE CLEANER AND DEGAUSSER APPARATUS

TECHNICAL FIELD

This invention relates to a video tape cleaner and degausser. More particularly, it relates to an apparatus for more efficiently and effectively cleaning video tape such that there is an improvement in video tape performance and an increase in head and tape life.

BACKGROUND OF THE INVENTION

The process of recording and playing video tapes results in the generation of a considerable amount of abrasive debris or wear products causing deterioration of tape performance. During record, play and wind modes, this debris is deposited on both sides of the video tape.

These wear products consist of small pieces of coating and base film removed from the tape by normal abrasion. These particles collect on any fixed surface, such as heads or guides, and slowly accumulate to form a projecting lump. Subsequently, surface temperature, created by friction from the moving tape, causes the debris to reattach to the tape surface.

It is the redisposition of this debris onto the tape surface that causes deterioration, accelerated head wear, tape drag and, finally, ultimate failure of the tape.

The tape cleaning and conditioning capabilities of the tape cleaner and degausser apparatus of the present invention constitute an important contribution towards overall improvement in video tape performance.

Regular use of the tape cleaner and degausser apparatus increases head and tape life. Additionally, the apparatus offers the benefits of precision rewinding and demagnetization of the video tape.

As the magnetic oxide crystals on magnetic tape continue to grow smaller, and the amount of information stored on the tape grows larger, it becomes more demanding that the surface of the tape be as clean as possible to prevent losing information because of poor tape to head contact.

The manufacture of video magnetic tape is a tedious and exacting process of growing magnetic oxide crystals and applying them to a sheet of base material such as acetate or Mylar polyester film in a plastic vehicle form of coating material and thereafter cutting the tape to the desired length and width. This is disclosed in U.S. Pat. No. 3,587,128.

The prior art describes several cleaning methods and apparatus such as U.S. Pat. No. 3,035,295, in which a metal or hard monocrystalline material scrapper with a uniform cutting edge is used to remove tape oxide from the tape.

Other tape cleaning apparatus are those pieces of apparatus described in the following U.S. Pat. Nos.:

3,266,196 describes a tape cleaner employing a gear reducer for driving the tape cleaning head;

3,475,782 describes a magnetic tape cleaner in which slight distortion of the tape is effected by two rollers on either side of a cleaning head and a hard monocrystalline material scrapper blade is used for scrapping the front surface of the tape;

3,701,178 describes a cassette tape cleaner with a plurality of scrapping blades that project into standard openings in the cassette when the cassette is inserted in the apparatus. A blast of air is then used to remove scrappings away from the blades and tape;

3,757,374 describes a magnetic tape cleaner where the tape contacts a blade having a plurality of cutting edges and then winds onto a take-up reel.

Other methods of cleaning magnetic tape have included the use of a solution in conjunction with ultrasonic agitation and, as disclosed in U.S. Pat. No. 4,620,256, a magnetic tape cleaner employing both scrapping and wiper means.

From the foregoing, it can been seen that the prior art has provided a variety of means of cleaning magnetic tape to avoid tape scratching, to remove metallic particles and other undesirable debris and to prevent unwanted loss of information from faulty tape to head contact.

Yet the prior art has not been totally satisfactory, probably because the embedded debris and other tape buildup was not adequately removed.

Additionally, one of the prior art discloses an apparatus capable of degaussing the tape at the same time the cleaning activity is taking place, or specifically designed to clean video magnetic tape in either a VHS or Beta format, as is the present invention.

None of the prior art has the easy access capability of the present invention allowing the replacement of the cleaning elements as needed.

Finally, the prior art does not reveal a bar condition station that allows a user to know when the cleaning bar needs to be rotated or changed.

SUMMARY OF THE INVENTION

The tape cleaner and degausser of the present invention is a precision video cassette tape cleaner and conditioner designed to clean, condition, rewind and, if desired, degauss one-half inch video cassette tapes. The apparatus has been designed as a compact tabletop unit; individual machines are designed for use with either VHS or Beta cassettes, since the cassettes are different in size.

The tape cleaning and conditioning capabilities of the tape cleaner and degausser apparatus improve video tape performance. Regular use of the tape cleaner and degausser increases head and tape life and offers the additional benefit of precision rewinding and demagnetization of the video tape.

In one preferred embodiment of the present invention, the tape cleaner and degausser apparatus comprises a plurality of wiper means for wiping the front and back surfaces of the video tape, a scrapper engaging the front surface of the video tape for removing debris therefrom, a degausser for demagnetizing the video tape, a power drive for winding the video tape from the video cassette supply reel past the wiper, scrapper and degausser and onto the video cassette take-up reel and a power drive for rewinding the video tape from the cassette take-up reel back onto the cassette supply reel.

The tape cleaner and degausser apparatus also includes a hinged clear dust cover over the rear half of the cleaner allowing for easy entry into the inner mechanism of the apparatus. This allows the cleaning bar and wiping stations to be removed and replaced as needed.

On the front panel of the tape cleaner apparatus, there is a bar condition station that informs the user when the cleaning bar needs to be rotated or replaced.

The apparatus uses a stainless steel cleaning bar and wiping stations to achieve maximum cleaning. Speed and tension are controlled throughout the forward and reverse cycles with the cleaning activity, scrapping and wiping, occurring during both cycles.

Commands controlling the cleaner and degausser functions are initiated by touch pad controls on the front panel of the unit. Tape movement and tension is controlled by capstan motors and their associated servo systems.

Roller guides with ball bearing mountings are used to guide the tape smoothly with a minimum of friction and misalignment.

In the Auto Load mode, the cleaner threads tape along its tape path by means of two roller loading posts. These posts also provide tape tension by holding the tape against the roller guides, cleaning bar and stationary wipe stations.

When the Cleaning mode is selected, a delay switch is activated that allows the movable wipe station to raise and move forward providing tape tension at the wipe station. The movable wipe station is normally in a lowered state, which allows the loading of the video tape cassette.

After the movable wipe station is in place, the cleaning activity begins with the tape transversing across the sharpened edges of the cleaning bar scrapping away the loose oxide and other debris.

The wiping tissue is continuously advanced during the tape motion, thus, constantly presenting a clean wiping surface to both sides of the tape. This aids in the removal of loose oxide and dirt from the tape surface.

The Rewind mode allows the user to clean the tape a second time, using the wiping stations and cleaning bar while the tape is rewound onto the cassette supply reel. If the Fast Rewind mode is selected, the delay switch is activated allowing the movable wipe station to disengage from the tape and retract into its lowered position. Thereafter, the roller loading posts move back into their original position, with the capstan motors taking up the tape slack. The tape then can rewind onto the supply reel at a faster rate.

When the Degauss mode is selected, the cleaner and degausser utilizes two erase heads to thoroughly degauss the tape. This function is used only after the cleaning cycle is completed and only when both the Rewind and Degauss touch pad controls are depressed simultaneously.

From the above description, it is evident that the tape cleaner and degausser apparatus of the present invention improves video tape performance and increases head and tape life by more efficiently and effectively cleaning video tape. In addition, the present invention allows video tape to be degaussed and cleaned in a single operation and allows access to the cleaning elements of the apparatus for easy replacement thereof.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION

Figure 1:
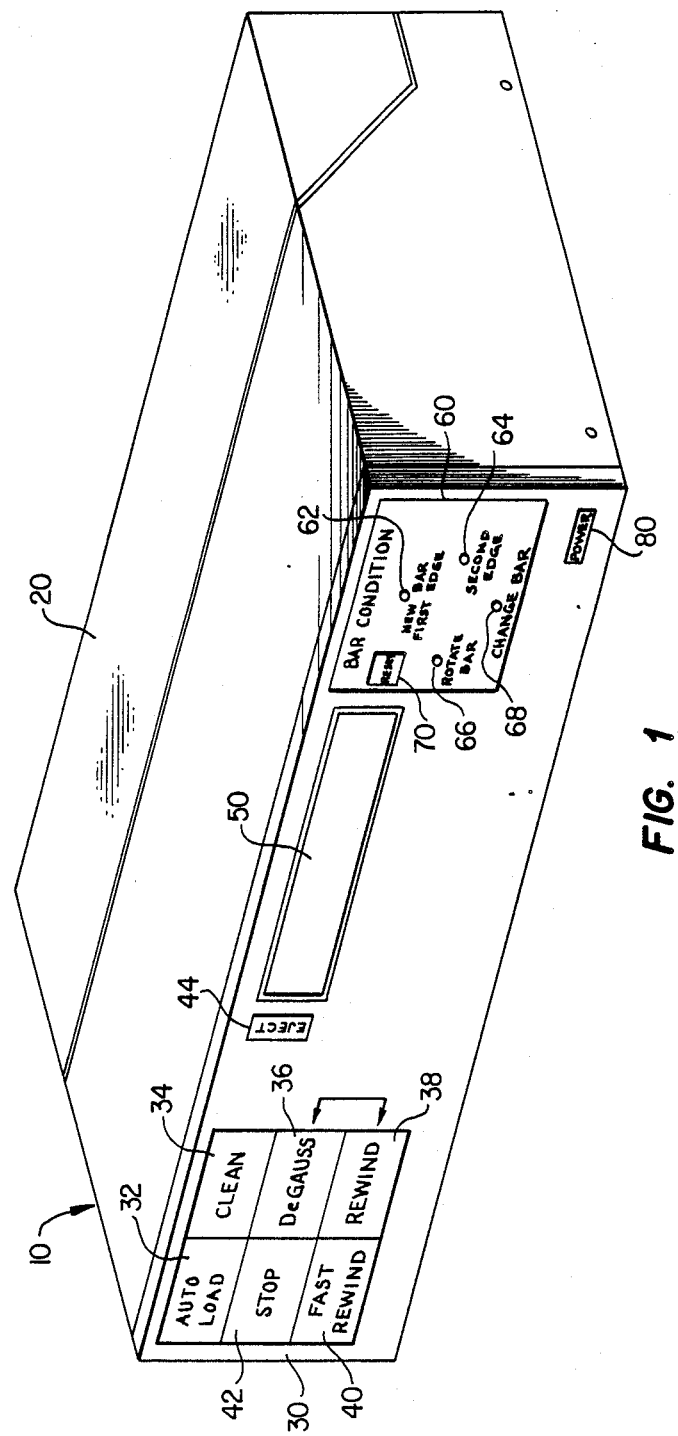
FIG. 1 is a perspective view of the exterior of the tape cleaner and degausser apparatus.
Figure 2:
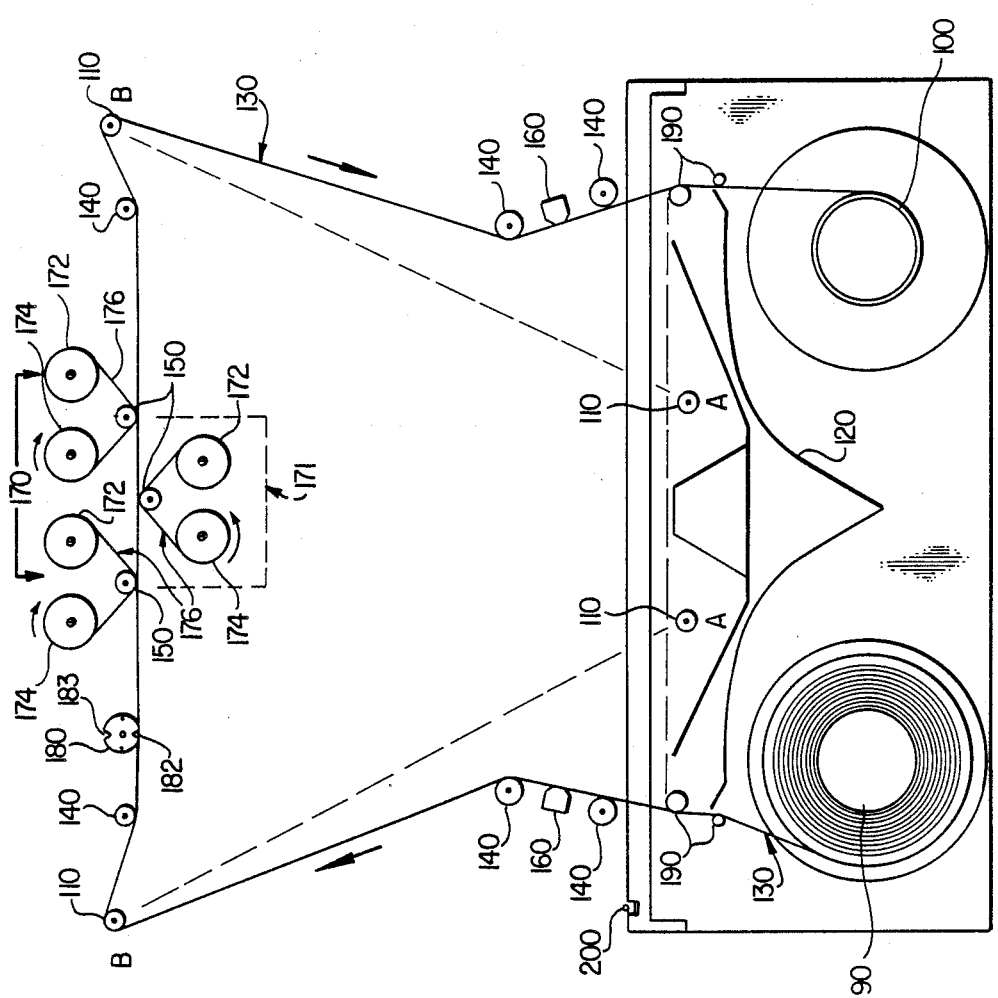
FIG. 2 is a schematic illustration of the interior of the tape cleaner and degausser apparatus.

The exterior view of the tape cleaner and degausser apparatus 10 in FIG. 1 reveals that a hinged clear dust cover 20 allows easy access to the internal mechanism of the invention (shown in FIG. 2). The front panel of the apparatus 10 has a series of touch pad controls 30 controlling the function and operation of the cleaner and degausser apparatus.

The touch pad controls include; Auto Load 32, Clean 34, Degauss 36, Rewind 38, Fast Rewind 40 and Stop 42. The functions of the different touch pad controls will be further discussed hereinafter.

Also in the front panel of the tap cleaner and degausser apparatus 10 is an eject push button 44 used to remove a video tape cassette after cleaning and degaussing. A cover door 50 is hinged at the top of the front panel for entry of the video tape cassette into the tape cleaner apparatus. The cover door also protects the internal mechanism of the cleaner by preventing dust and other foreign particles from entering the cleaner.

A bar condition station 60, located on the front panel of the cleaner and degausser 10, contains a plurality of LED displays for providing information on the status of the cleaning bar 180 (shown in FIG. 2).

The appropriate LED is activated when the apparatus 10 is in use. The LED's are provided to indicate the new bar first edge 62; second edge 64; rotate bar 66 and change bar 68.

The LED for the new bar first edge 62 is activated when the cleaning bar 180 (shown in FIG. 2) is new and the first cleaning edge 182 (shown in FIG. 2) is in use to remove debris from the surface of the video tape.

The LED for the second edge 64 is activated, along with the LED for the rotate bar 66, when it is necessary to rotate the cleaning bar 180 in order to allow the second cleaning edge 183 to engage the surface of the video tape for cleaning. After rotation, only the LED for the second edge 64 remains activated. The LED for the change bar 68 is energized when it is time to replace the cleaning bar 180.

A conventional timer switch and associated circuitry activate the various bar condition station LED's at predetermined intervals. Such intervals are usually set by determining the number of hours the cleaner and degausser may be used before the cleaning bar edges deteriorate.

Finally, there are reset 70 and power 80 touch pad controls on the front panel of the tape cleaner and degausser 10 that turn the apparatus on and off.

In FIG. 2, the internal mechanism of the apparatus and a typical cassette are shown. The video cassette supply reel 90 is a conventional reel ordinarily of plastic or the like onto which the leading edge of the video tape 130 is wound.

The video cassette supply reel 90 is well known and need not be described at length herein. The supply reel may be braked by any suitable device such as a brake or clutch (not shown) to maintain tension in the tape, although in the preferred embodiment, the capstan motor and their associated servo systems (not shown) are utilized for the braking function as the video tape is wound onto the video cassette take-up reel 100.

The video cassette take-up reel 100 is also driven by any suitable device such as a capstan motor with clutch (not shown). The capstans may be reversible to form part of both the winding and rewinding means.

Additionally, in the preferred embodiment of the invention, a tape slack preventing plate 120 (the tape slack preventing plate is a normal component of the video cassette and is not part of the embodiment of the invention), a plurality of roller guides 140 having ball bearing mountings and fixed guides 150 are used to guide the video tape smoothly and with a minimum of friction and misalignment. The guides also provide tape tension.

Under normal conditions, the operation of the tape cleaner and degausser apparatus 10 begins when the video tape cassette is loaded into the unit through the cover door 50 (shown in FIG. 1) and the Auto Load touch pad control 32 is depressed.

The Auto Load mode causes the tape cleaner and degausser apparatus 10 to thread the tape 130 of the video cassette along the tape path by means of a pair of movable roller loading posts 110. The roller posts 110 move from position A to position B in the cleaner and provide tape tension by holding the tape 130 against the roller guides 140, the cleaning bar 180 and the fixed guides 150 of the stationary wipe stations 170.

After the tape is loaded, in the normal sequence of operation, the Clean touch pad control 34 of FIG. 1 is depressed. This activates a conventional delay switch (not shown) causing a movable wipe station 171 to raise and move forward providing tape tension at the wipe stations 170 and 171. The movable wipe station 171 is normally in a lowered state to allow the loading of the tape cassette and threading of the tape 130 by the roller loading posts 110.

Once the Clean touch pad control 34 is depressed, however, the movable wipe station 171 is raised and brought forward by conventional mechanical means and is positioned in a predetermined location inbetween, inverted and facing the stationary wipe stations 170.

After the movable wipe station 171 is positioned, the cleaning activity begins. The stationary wipe stations 170 wipe the front surface of the video tape and the movable wipe station 171 wipes the back surface of the video tape.

Both of the wipe stations 170 and the movable wipe station 171 have a supply spool 172 with the wiping tissue attached thereon for supplying the wiping tissue 176 to a take-up spool 174 for taking up the used wiping tissue. The wiping stations also include a fixed guide 150 centrally and forwardly located between the spools that allows the tissue to move across the surfaces of the tape 130.

The wiping tissue 176 is either felt or a felt-like material that is continuously advanced during the tape motion, thus, constantly providing a clean wiping surface to both sides of the tape. This aids in the removal of loose oxides and debris from the tape surfaces.

At the beginning of the cleaning activity, the tape surface is scrapped by the cleaning bar 180. The cleaning bar 180 has at least sharpened cleaning edges 182 and 183 for engaging the tape surface 130 and removing the built up oxides and debris from the surface of the tape.

In the preferred embodiment of the invention, the cleaning bar 180 is mounted in the tape cleaner and degausser prior to the wiping stations 170 and 171 and is made of stainless steel or a like substance.

Again, in the normal sequence of operation of the tape cleaner and degausser, once the tape has been completely cleaned and wound onto the video cassette take-up reel 100, the Rewind touch pad control 38 is depressed, allowing the user to clean the tape a second time in the same manner as set forth above as the tape is rewound onto the cassette supply reel 90.

In addition, when the Fast Rewind touch pad control 40 is depressed, a conventional delay switch (not shown) is activated allowing the movable wipe station 171 to disengage from the tape 130 and retract into its lowered position before the fast rewind commences. The roller loading posts 110 then move from position B back to position A and the capstan motors take up the tape slack. The tape then rewinds onto the cassette supply reel 90 at a much faster rate than before, but no additional cleaning will occur, unlike when the rewind mode is used.

If the user wants to degauss as well as clean the video tape, then the Rewind touch pad control 38 and the Degauss touch pad control 36 must be depressed simultaneously. This function is available after the first cleaning cycle has been completed and is accomplished by a plurality of conventional erase heads 160 that thoroughly demagnetize the tape as it is rewound onto the cassette supply reel 90 from the cassette take-up reel 100.

Finally, FIG. 2 reveals the cover latch 200 hinged to the top of the apparatus 10 that allows the clear dust cover 20 of FIG. 1 to open and close for easy access to and replacement of the cleaning bar 180 and wipe stations 170 and 171.

Although the preferred embodiments of the invention have been illustrated in the accompanying drawings and described in the foregoing detailed description, it will be understood that the invention is not limited to the embodiments disclosed, but is capable of numerous rearrangements, modifications and substitutions of parts and elements without departing from the spirit of the invention.

I claim:

1. A tape cleaner and degausser apparatus for cleaning, conditioning and degaussing magnetic video tape comprising:
    a wiper means for wiping the front and back of the surfaces of a video tape;
    a scrapping means engaging the front surface of the video tape for removing debris and oxide therefrom;
    a degaussing means for demagnetizing the video tape;
    means for moving the video tape past the wiper means, scrapping means and degaussing means;
    a front panel having a plurality of touch pad controls for controlling and managing the operation of the apparatus;
    a bar condition station on the front panel containing a plurality of LED displays for providing information on the status of the scrapping means; and
    a clear dust cover hinged to the rear top half of the apparatus providing easy access to the internal mechanism of the apparatus for replacing of the wiping and scrapping means.

2. A tape cleaner and degausser apparatus in accordance with claim 1 wherein the wiper means further comprises:
    a plurality of stationary wipe stations for wiping the front surface of the video tape including:
    a supply spool for supplying wiping tissue;
    a take-up spool for taking up the wiping tissue after the tissue has been wiped across the front surface of the video tape; and
    a fixed guide centrally and forwardly located between the supply spool and take-up spool for providing tension and alignment of the wiping tissue across the front surface of the video tape.

3. A tape cleaner and degausser apparatus in accordance with claim 2 wherein the wiper means further comprises a movable wipe station for wiping the back surface of the video tape having a supply spool, take-up spool and fixed guide and wherein the moveable wipe station moves to a predetermined position inbetween, inverted and facing the stationary wipe stations.

4. A tape cleaner and degausser apparatus in accordance with claim 1 wherein the scrapping means further comprises a cleaning bar having sharpened cleaning edges mounted prior to the wiper means engaging the front surface of the video tape for removing loose oxides and other debris therefrom.

5. A scrapping means in accordance with claim 4 wherein the cleaning bar is stainless steel or a like material.

6. A tape cleaner and degausser apparatus in accordance with claim 1 wherein the degaussing means further comprises a plurality of eraser heads with at least one erase head located before the scrapping and wiping means and at least one erase head located after the scrapping and wiping means for demagnetizing the video tape.

* * * * *